United States Patent [19]
Peterson et al.

[11] Patent Number: 5,813,649
[45] Date of Patent: Sep. 29, 1998

[54] ENERGY-ABSORBING DEFORMABLE BRACKET

[75] Inventors: Leslie D. Peterson; Charles N. Whitaker, both of Phoenix; John A. DiPalma, Gilbert, all of Ariz.

[73] Assignee: Simula, Inc., Phoenix, Ariz.

[21] Appl. No.: 614,603

[22] Filed: Mar. 13, 1996

[51] Int. Cl.⁶ .................................................. F16M 13/00
[52] U.S. Cl. .......................... 248/618; 248/300; 248/638; 267/160; 297/302.1
[58] Field of Search ..................... 248/300, 548, 248/618, 174, 188.1, 157, 900, 638; 296/63, 68.1; 297/302.1; 267/136, 140.5, 160, 165

[56] References Cited

U.S. PATENT DOCUMENTS

| | | | |
|---|---|---|---|
| 2,675,525 | 4/1954 | Wiancko | 267/160 X |
| 2,793,028 | 5/1957 | Wheeler | 267/160 |
| 3,252,696 | 5/1966 | Friedel | 267/160 |
| 3,465,997 | 9/1969 | Piske | 267/160 X |
| 4,325,446 | 4/1982 | Hicks | 296/63 X |
| 4,752,058 | 6/1988 | Weber | 248/638 X |
| 4,927,124 | 5/1990 | Spedding et al. | 267/165 X |
| 5,013,013 | 5/1991 | Spedding | 267/165 |
| 5,280,889 | 1/1994 | Amil et al. | 248/618 X |
| 5,409,200 | 4/1995 | Zingher et al. | 267/160 |
| 5,505,521 | 4/1996 | Meiller et al. | 267/160 X |

*Primary Examiner*—Ramon O. Ramirez
*Assistant Examiner*—Derek J. Berger
*Attorney, Agent, or Firm*—Crowell & Moring, LLP

[57] ABSTRACT

A constant-load deformable bracket for protecting the occupants of vehicles and/or objects from injury or damage resulting from vertical acceleration or deceleration. The constant-load deformable bracket starts to deform when the magnitude of the vertical force on the bracket reaches a predetermined value. In vehicle applications, the deformable bracket is installed between a seat and its platform. The deformable bracket may also be used in a storage container to protect goods.

40 Claims, 11 Drawing Sheets

ENERGY-ABSORBING DEFORMABLE BRACKET

BACKGROUND

1. Field of the Invention

The present invention relates to energy-absorbing structures that absorb impact energy by deformation, and thus reduce the severity of any resulting injury or damage.

2. Background of the Invention

Energy absorption has been used to protect personnel or equipment from harmful accelerations/decelerations for many years. Energy-absorbing devices presently in use include crushable materials, cushioning materials, springs, airbags and shock absorbers.

For the most part, these energy-absorbing devices work well. However, these devices do not provide adequate protection against the effects of vertical acceleration/deceleration in vehicles in which space is highly restricted, such as military trucks and helicopters, or in certain storage containers. Springs, crushable materials, vehicle shock absorbers, and air bags are inadequate for a variety of reasons. For example, springs produce rebound energy; crushable materials have limited energy-absorption capabilities; shock absorbers are too heavy, too big, and need maintenance; and air bags require sophisticated impact sensors and inflation devices. Furthermore, current plastic deformation devices such as metal band (or wire) bending devices, metal tube inversion mechanisms, and metal tube deforming devices require more space than is available in military vehicles or helicopters, or in certain containers.

The present invention is specifically aimed at the protection of occupants of land vehicles from land mine explosions. It can also be used in helicopters that have limited cockpit space, in containers of limited size, and for impact protection in parachute drops of equipment.

Typically, seating in military land vehicles is mounted directly to a seat frame or to a platform. This mounting is either directly or indirectly anchored to the main frame of the vehicle. Therefore, upward vehicle acceleration from a mine blast will directly accelerate the vehicle seats, with almost no attenuation of the force of the impact. Even with armor on the underside of the vehicle, the risk of spinal injury to the seat's occupant remains high, because typical seating has a very low capacity for energy absorption. Present energy absorption devices do not have sufficient energy-absorbing capacity to provide effective protection from mine blasts, or require more space than is available under a vehicle seat.

Accordingly, there is a need for a compact energy-absorbing device that specifically dissipates the impact of vertical acceleration or deceleration.

SUMMARY OF THE INVENTION

The present invention is an energy-absorbing bracket that protects the occupants of land vehicles or aircraft from injuries resulting from vertical acceleration/deceleration. It can also be used to protect cargo from damage resulting from sudden vertical acceleration/deceleration.

Figure 1A:
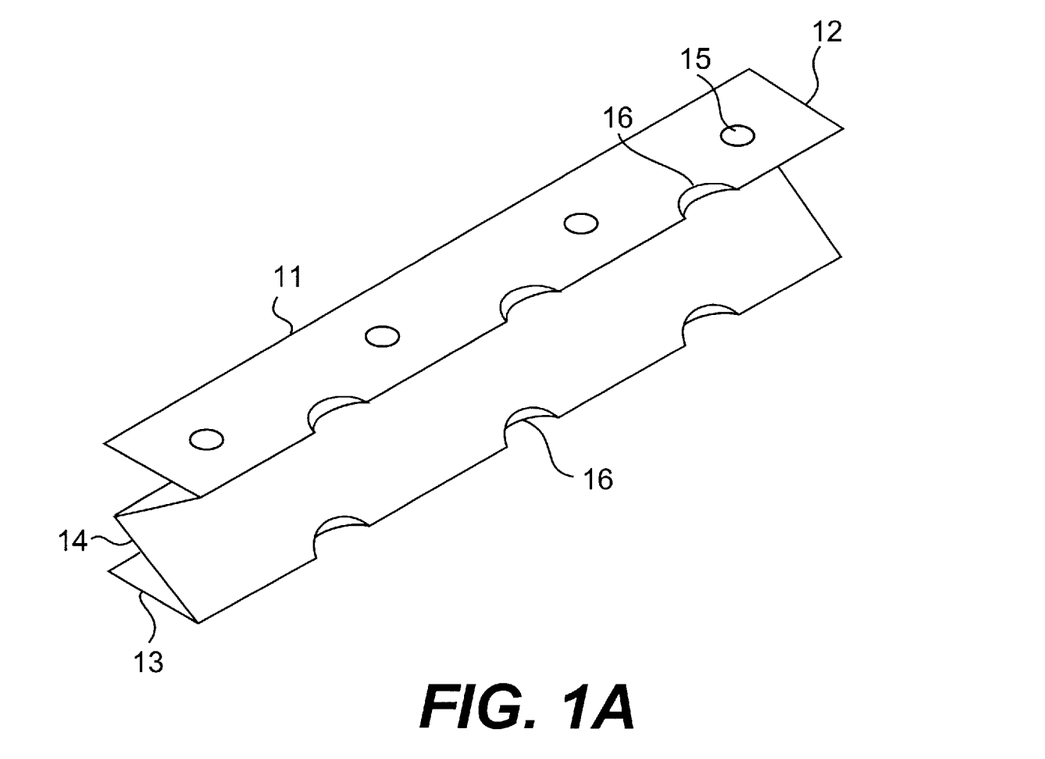
FIG. 1A is a schematic diagram of a top view of a single deformable bracket shaped according to the first preferred embodiment of the present invention.
Figure 2:
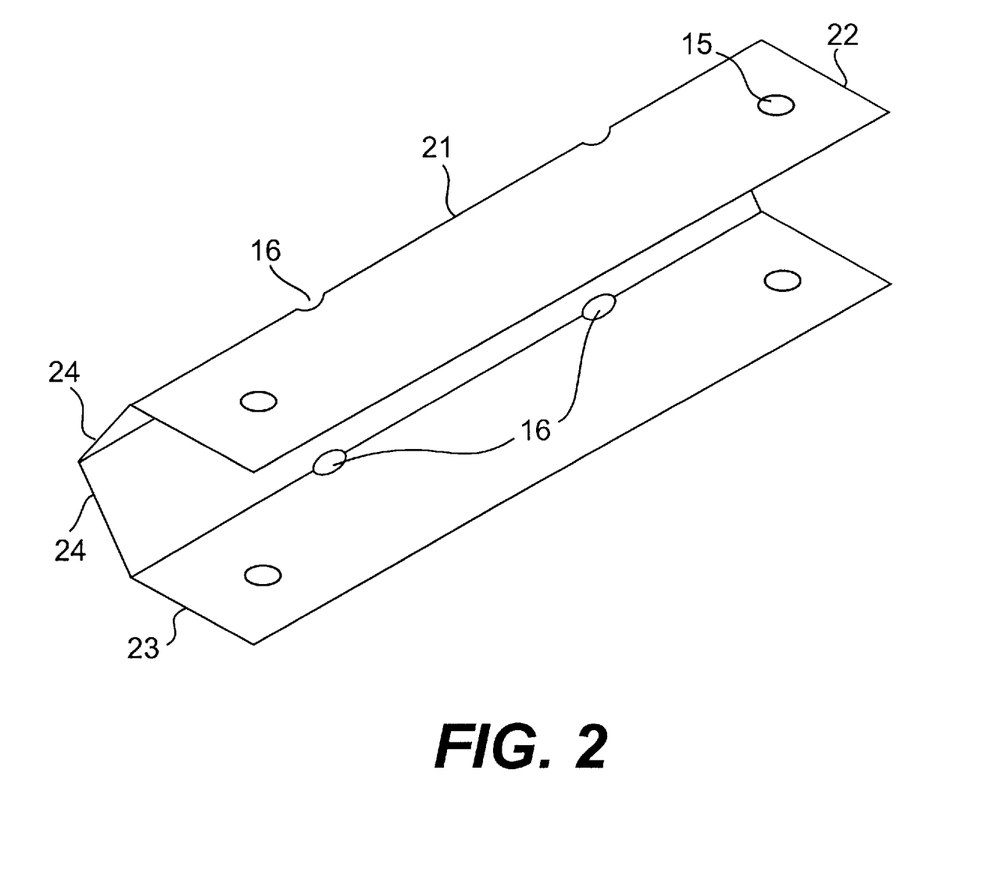
FIG. 2 a schematic diagram of a top view of a single deformable bracket shaped according to the second preferred embodiment of the present invention.

In a first preferred embodiment of the present invention, the energy-absorbing bracket is formed in the shape of the Greek letter $\Sigma$. As shown in FIG. 1A, it is a unitary sheet which comprises two flat, roughly parallel sections joined together by two inwardly slanting sections. A second preferred embodiment is similar to the first preferred embodiment, but, as shown in FIG. 2, it is shaped as a segmented letter "C," i.e., with the slanting sections slanting outwardly instead of inwardly. The energy-absorbing brackets of either embodiment may be used singly, in pairs, or in other combinations.

When used in seating systems, the brackets of the present invention are installed between the seat and the mounting platform. The brackets are the primary support for the seat. The brackets can be easily installed in existing vehicles, by substituting the bracket for all or a part of a seat's support structure.

The brackets of the present invention start to deform when subjected to a load having a magnitude above a predetermined value. The load required to continue deforming the bracket remains at a nearly constant value as the bracket deforms. This "constant load" deformation is an important factor in providing protection to the seat's occupant because it ensures that the bracket only continues to deform when it has to deform to protect the occupant. The load required to further deform the bracket must not change by more than 10% from its initial value as the bracket is deformed, although loads which do not change by more than 5% are preferable.

Constant load deformation is achieved by designing the deformable bracket such that the reduction in force resulting from the changing geometry of the bracket is roughly cancelled by the increase in force required due to work hardening of the bracket material. The net result is a nearly constant resistive load throughout the available deflection distance. Because the deformable bracket of the present invention is a roughly constant load bracket, it protects the seat occupant with maximum efficiency from when the bracket starts deformation until it stops deformation.

Another major advantage of the deformable bracket of the present invention is that it can use nearly all of its installed height for deflection. This occurs because the collapsed height of the deformable bracket, which is fabricated from sheets of material, is extremely small.

The present invention was originally developed for the protection of vehicle occupants from land mines. However, it can also be used to mount crew seats in aircraft, particularly in helicopters (which experience vertical impact forces more often than fixed-wing aircraft). Another effective application is as mounting brackets in storage containers for impact protection during shipment of sensitive equipment or during parachute drop of equipment.

Accordingly, it is an object of the present invention to protect human occupants in land vehicles from injury due to vertical acceleration or deceleration.

It is another object of the present invention to protect human occupants in some fixed- and rotary-wing aircraft from injury due to vertical acceleration or deceleration.

It is another object of the present invention to protect equipment or other cargo from damage due to vertical acceleration or deceleration.

It is another object of the present invention to provide a means of absorbing energy that is dissipated by a vertical impact in any application in which installation space is limited.

It is another object of the present invention to provide an energy-absorbing device that provides a roughly constant resistive force over its entire deflection distance.

It is another object of the present invention to provide an energy-absorbing means that does not recoil subsequent to its operation.

It is another object of the present invention to provide non-elastic means for the prevention of injury and/or damage to persons and/or cargo which is subjected to rapid vertical acceleration or deceleration, and for safely absorbing the energy resulting from such rapid acceleration or deceleration.

Definitions

A bracket exhibits "constant load deformation" if the load required to further deform the bracket is roughly constant as the bracket undergoes deformation, because the reduction in force required due to the changing geometry of the bracket is roughly cancelled by the increase in the force required due to work hardening of the bracket material. "Roughly constant" as used in the definition of constant load deformation means that the force required to further deform the bracket does not change by more than 10% as the bracket is deformed from its initial configuration to its maximum deformation.

DETAILED DESCRIPTION OF PREFERRED EMBODIMENTS OF THE INVENTION

The first and second preferred embodiments of the present invention are shown in FIGS. 1A and 2, respectively. FIG. 1A shows that the deformable bracket 11 of the first embodiment of the present invention is shaped like the Greek letter Σ. It is a single metal sheet which has been formed into four sections: a first, e.g., upper, horizontal section 12, a second, e.g., lower, horizontal section 13, and two slanted sections 14 which join the upper to the lower horizontal sections. The terms "upper" and "lower" are relative terms which indicate that sections 12 and 13 are at opposite ends of the bracket from each other, and sections 14 are in between.

Figures 1B, 1C:
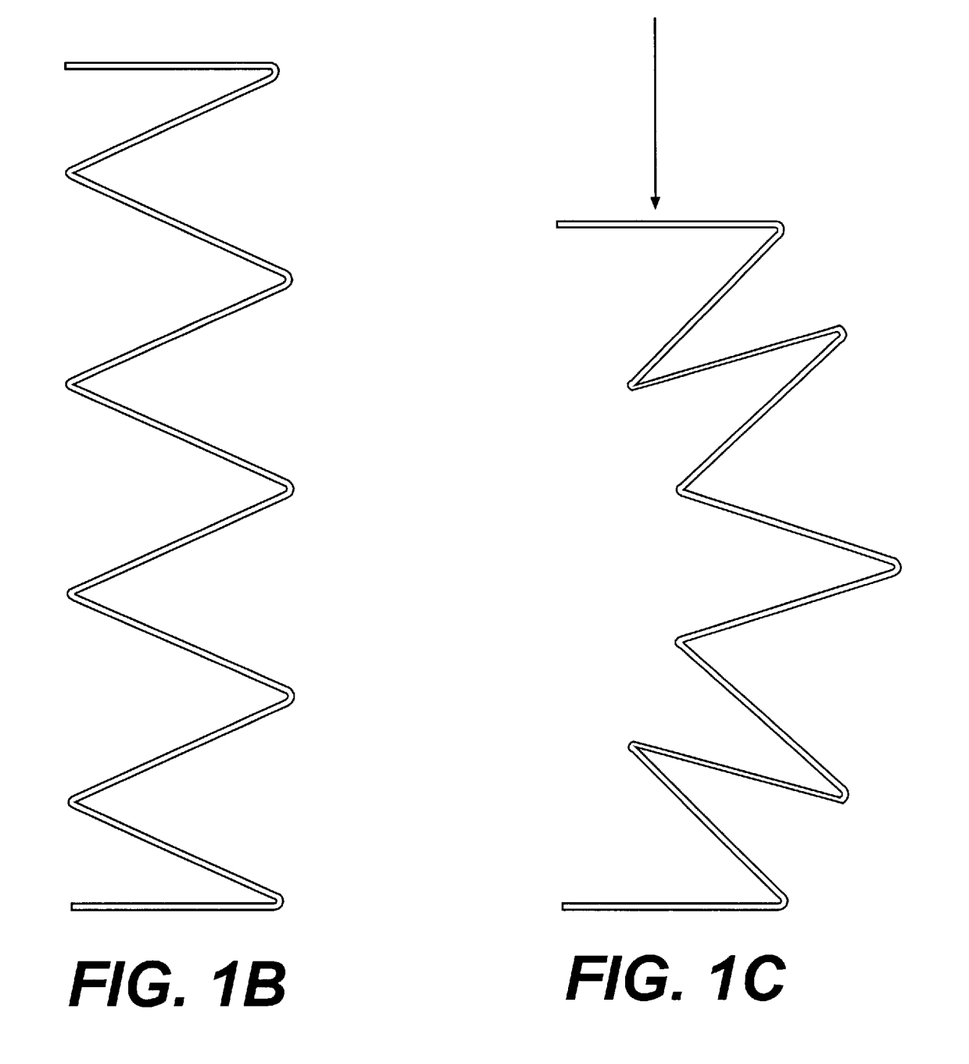
FIG. 1B is a schematic end view diagram of a multi-section deformable bracket, prior to the application of vertical stress.
FIG. 1C is a schematic end view diagram of a multi-section deformable bracket, under vertical stress.

Additional slanted sections, mounted in a zigzag configuration may also be used, as shown in FIG. 1B, although multi-section deformable brackets are not as stable under vertical stress as two-section brackets, as shown in FIG. 1C. When multi-section brackets are used to implement the present invention, a guide frame must be used to maintain the stability of the mechanical configuration.

Sections 12 and 13 are roughly parallel to each other, with section 12 roughly directly above section 13. The deformable bracket is mounted to, e.g., the seat of the vehicle using holes 15 in flat section 12, and to a support platform in the floor of the vehicle using similar holes in section 13. The number and size of mounting holes 15 can be selected by one of ordinary skill in the art according to the specific installation. FIG. 1A also shows cut-out holes 16 in the common edge of section 12 and its adjoining section 14, and in the common edge of section 13 and its adjoining section 14, which are used to "fine tune" the predetermined load the bracket can tolerate prior to inelastic deformation, as discussed below. Holes 16 can also be cut-out of the common edge of two sections 14.

FIG. 2 shows that the deformable bracket 21 of the second preferred embodiment of the present invention is shaped like a segmented C. It is a single metal sheet that has a first horizontal section 22 and a second horizontal section 23 joined by two slanted sections 24. Sections 22 and 23 are roughly parallel to each other, with section 22 roughly directly above section 23. The deformable bracket is mounted to, e.g., the seat of the vehicle, using holes 15 in flat section 22, and to a support platform in the floor of the vehicle using holes in flat section 23. Holes 16 in the three formed edges of the bracket can be used to "fine tune" the predetermined load the bracket can tolerate prior to deformation.

Figure 3:
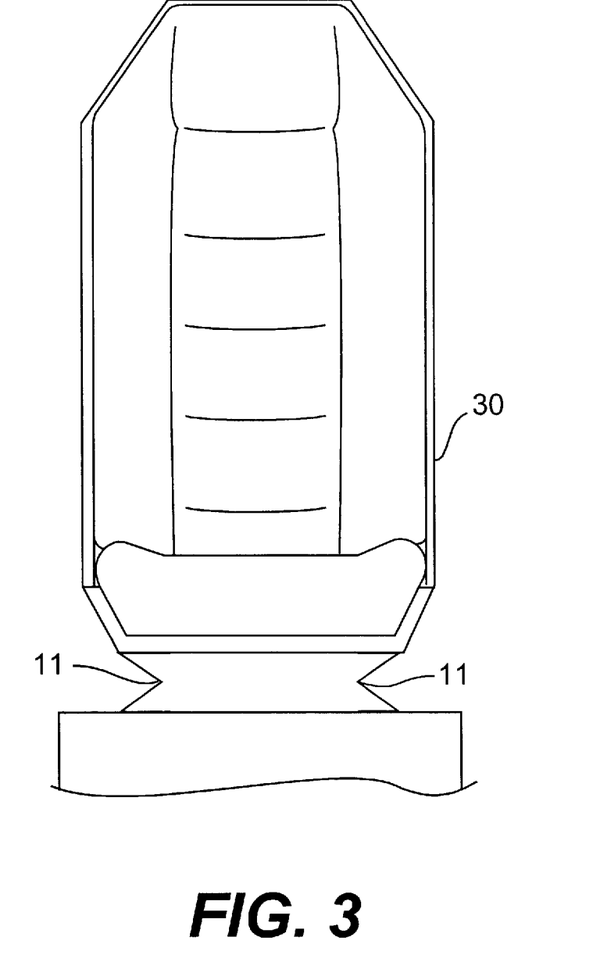
FIG. 3 frontal view of a pair of deformable brackets shaped according to the first preferred embodiment, installed to support a vehicle seat.
Figure 4:
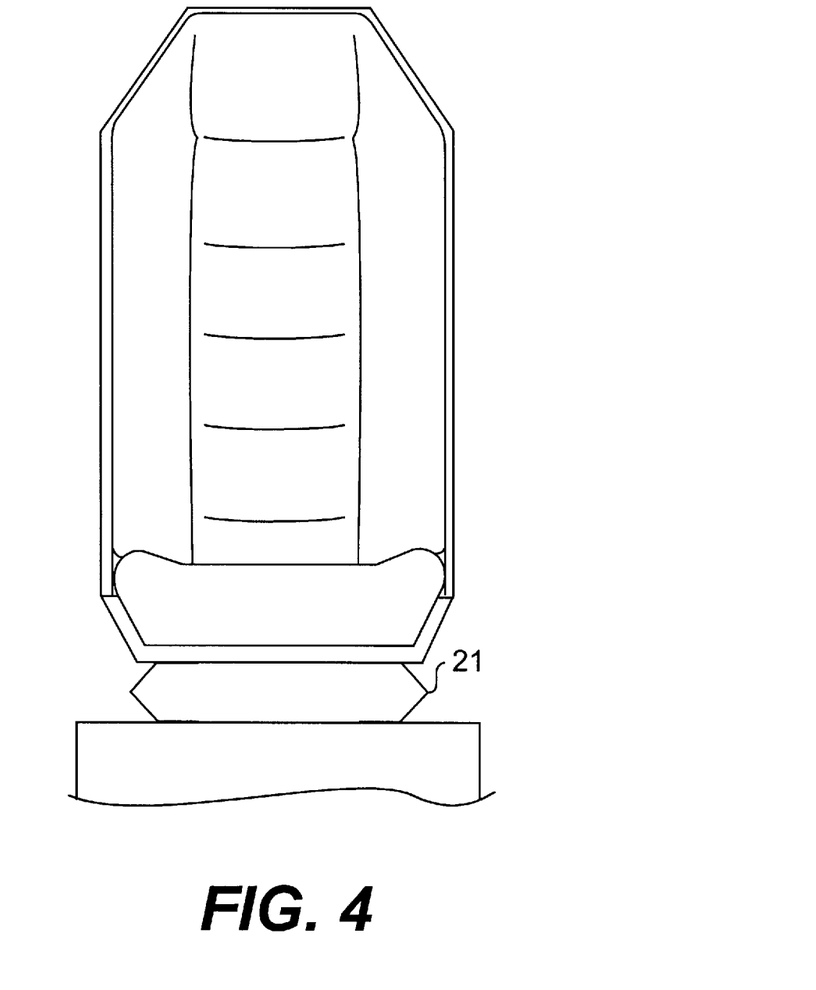
FIG. 4 is a frontal view of a pair of deformable brackets shaped according to the second preferred embodiment, installed to support a vehicle seat.
Figure 5:
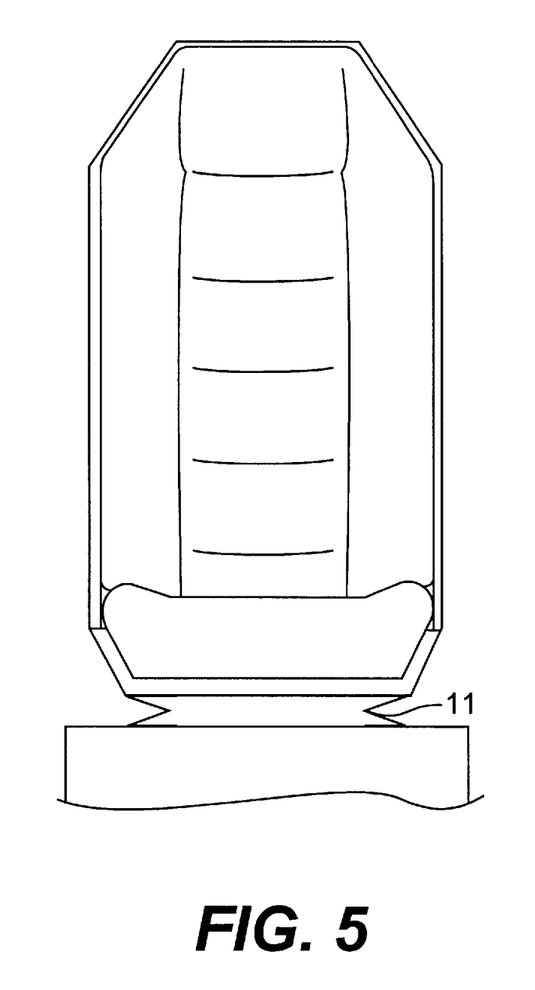
FIG. 5 is a schematic diagram of a frontal view of a pair of collapsed deformable brackets shaped according to the first preferred embodiment, installed to support a vehicle seat.
Figure 6:
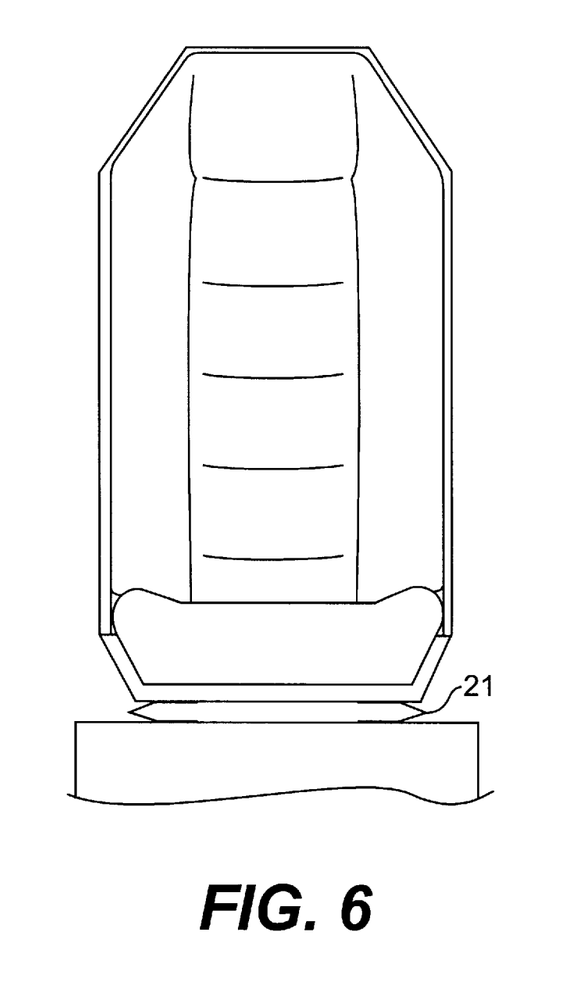
FIG. 6 is a schematic diagram of a frontal view of a pair of collapsed deformable brackets shaped according to the second preferred embodiment, installed to support a vehicle seat.
Figure 7:
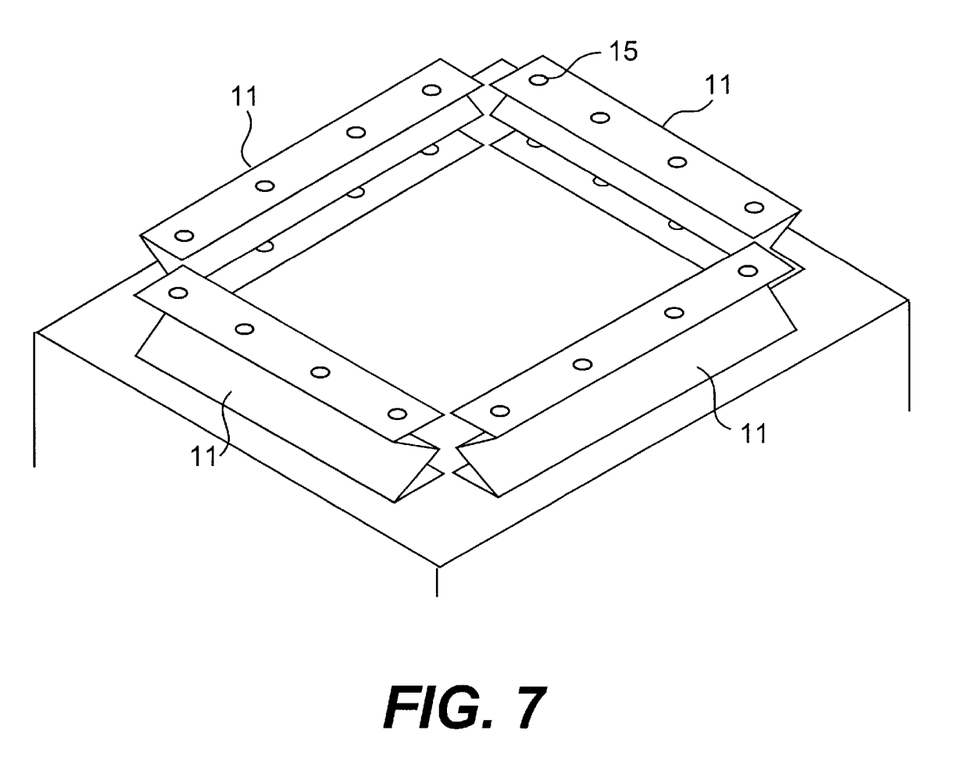
FIG. 7 is a schematic diagram of the top view of a set of four deformable brackets, shaped according to the first preferred embodiment, arranged in a rectangular configuration.
Figure 8:
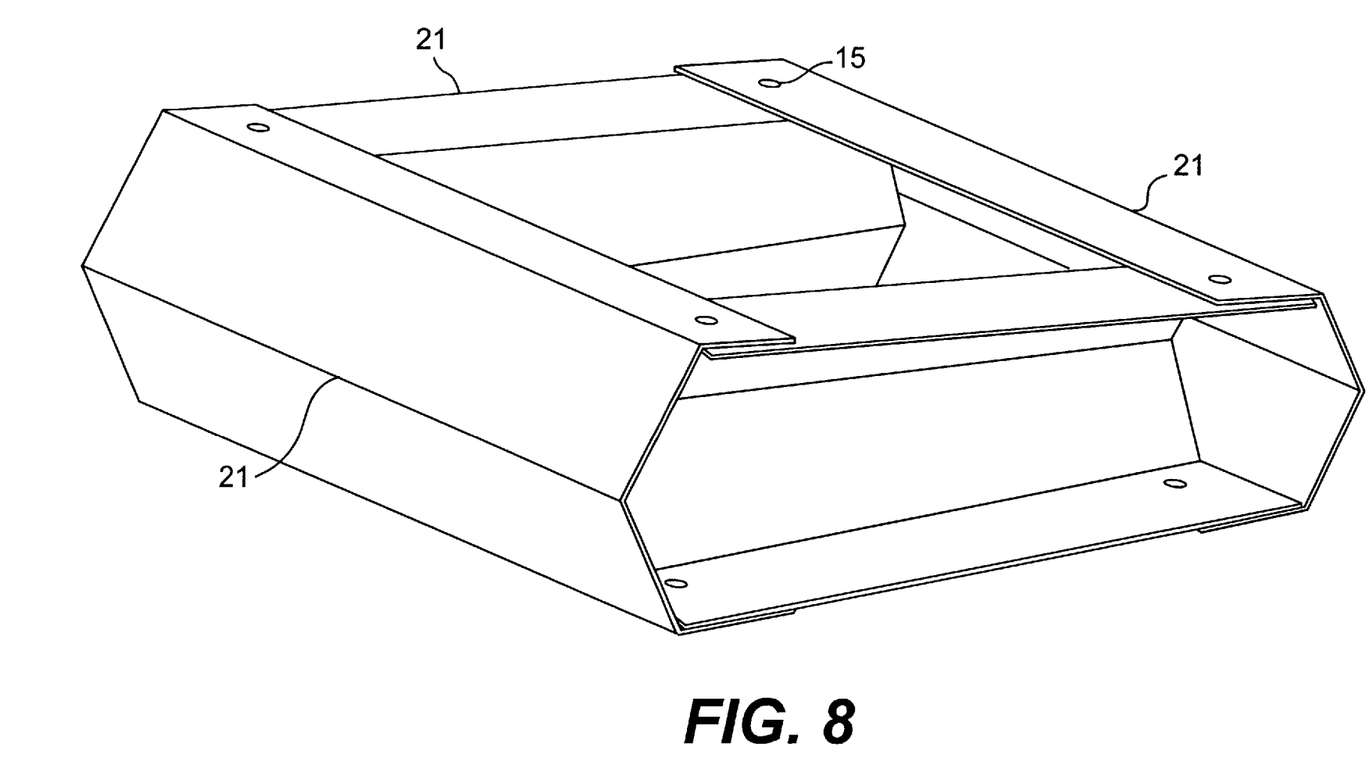
FIG. 8 is a schematic diagram of the top view of a set of four deformable brackets, shaped according to the second preferred embodiment, arranged in a rectangular configuration.

FIG. 3 shows two deformable brackets 11 of the first preferred embodiment of the present invention as they would be installed in a typical military truck. FIG. 4 shows two deformable brackets 21 of the second embodiment as they would be installed in a military truck. An essentially vertical impact having a magnitude sufficient to deform the brackets would collapse the energy-absorbing brackets, as shown in FIGS. 5 and 6, respectively. However, if the impact includes a significant lateral component, the single pair of brackets could become unstable. The resulting lateral motion could impede the proper stroking of the seat in the vertical direction. Accordingly, the deformable brackets of the present invention are preferably installed in sets of four in a rectangular configuration, as shown in FIG. 7 (for the first embodiment) and FIG. 8 (for the second embodiment). The pairs of deformable brackets installed as shown in FIGS. 7 and 8 complement each other by acting as folding shear planes that stabilize each other.

In normal use, prior to an explosion or a crash, the present invention is a very stiff mounting platform, because the load at which the brackets start to deform is much higher than normal operating loads. Thus the brackets act as springs with a very stiff spring constant, which have a limited range under which they undergo elastic deformation. Within the range of elastic deformation, the brackets move a relatively short distance. Beyond that range, at relatively high loads, the brackets deform inelastically. The load at which inelastic deformation starts is selected to be as high as possible, yet be below the load at which the occupant of the seat may suffer spinal or other serious injury.

During normal use, the brackets stay within the bottom 20–25% of the elastic range of the stress/strain curve. Thus the brackets do not undergo any work hardening during normal use.

Studies have shown that a vertical acceleration/deceleration well in excess of approximately 12 Gs are required before significant injuries occur. In the case of military ground vehicles, normal operations would rarely more than 2 G or 3 G vertical acceleration/deceleration, which would have virtually no effect on a 12 G structure. Accordingly, a preferred range for the constant load deformation in the present invention is from about 12 Gs up to about 17 Gs, for a person that is at the 50th weight percentile for that particular application.

The FAA standard for a 50th weight percentile person is 170 pounds. Thus, if SW is the seat weight, the constant deformation load should be in the range from 12×(170+SW) pounds to 17×(170+SW) pounds. More generally, if the seat is designed for a person having a weight of P pounds, the constant deformation load should preferably be selected between 12×(P+SW) pounds to 17×(P+SW) pounds.

The actual constant deformation load used for each specific application must be calculated such that it corresponds to acceptable spinal loading under the anticipated dynamic conditions for that application. Factors which contribute to the choice of the predetermined constant deformation load include the intensity and shock profile of the explosion, the mass and suspension of the vehicle, and the mass and construction of the seat.

In a land mine explosion under a vehicle, for example, the upwards acceleration of the of the occupant's seat will build up as an upward force on the occupant until the seat starts stroking at the predetermined constant load of the deformable bracket. The system will continue to collapse as long as the load between the vehicle and the occupant remains above the predetermined constant load, or until the bracket reaches the end of its available deflection distance.

Figure 9:
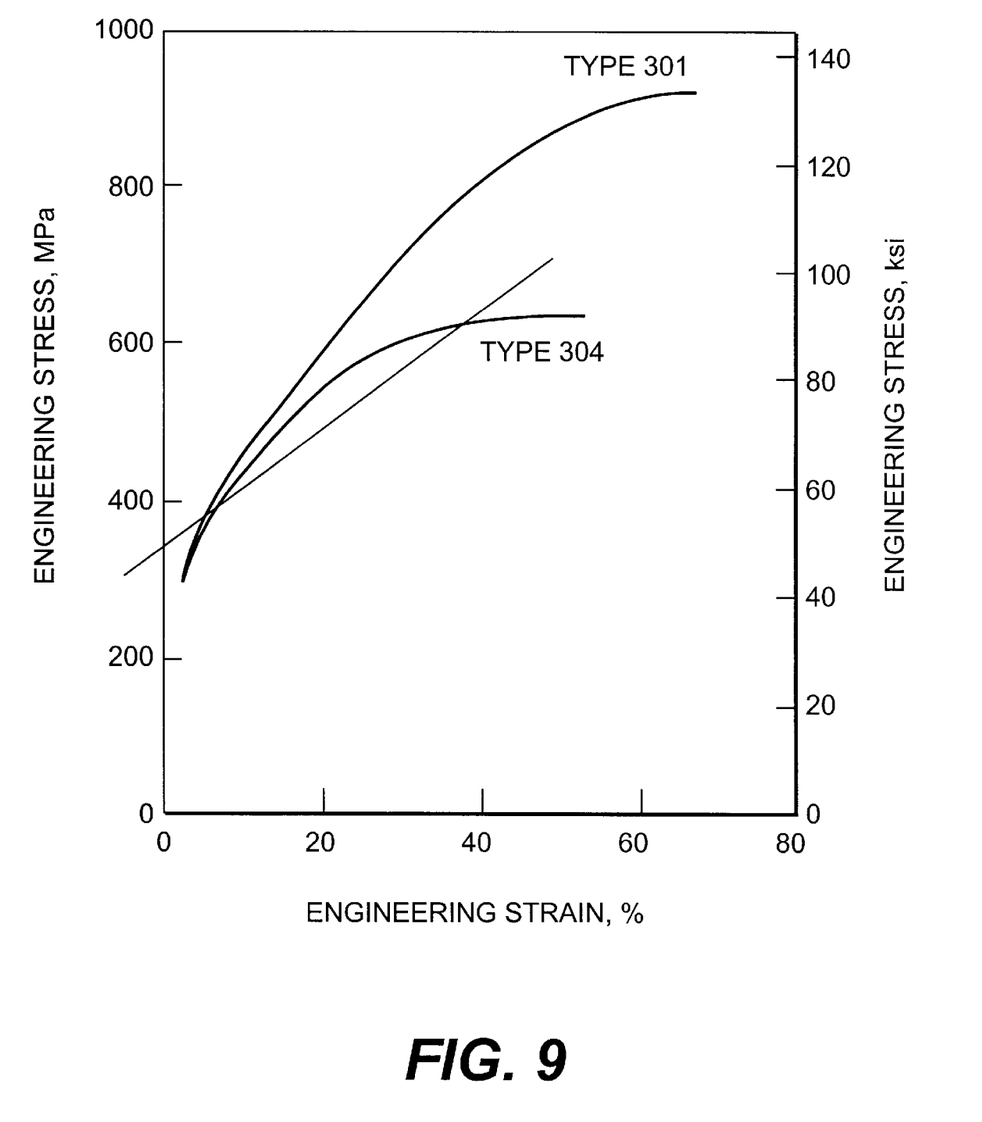
FIG. 9 is a plot of the stress-strain curves for types 301 and 304 stainless steel.

The preferred material for the energy-absorbing brackets is a metal, preferably high ductility stainless steel such as stainless steel 304 (S30400 in the Unified Numbering System). This is a readily available material which is corrosion resistant, and has a relatively high elongation characteristic (up to 50%), and a stable performance through the plastic deformation range of its stress/strain curve, as shown in FIG. 9. Stainless steel 301 is not a preferred material, because it undergoes a structural transformation from austenic to martensitic during deformation, which results in a much higher secondary slope to its stress/strain curve, as shown in FIG. 9.

The predetermined constant load at which the brackets start to deform can be selected by selecting the thickness of the sheet. In many cases, the predetermined constant load cannot be obtained using a standard thickness of material. In these cases, the next higher thickness material is selected, and the predetermined constant load for deformation is obtained by, e.g., by punching holes 16 at the bend in the brackets before forming the bracket.

Design Example I

Figure 10:
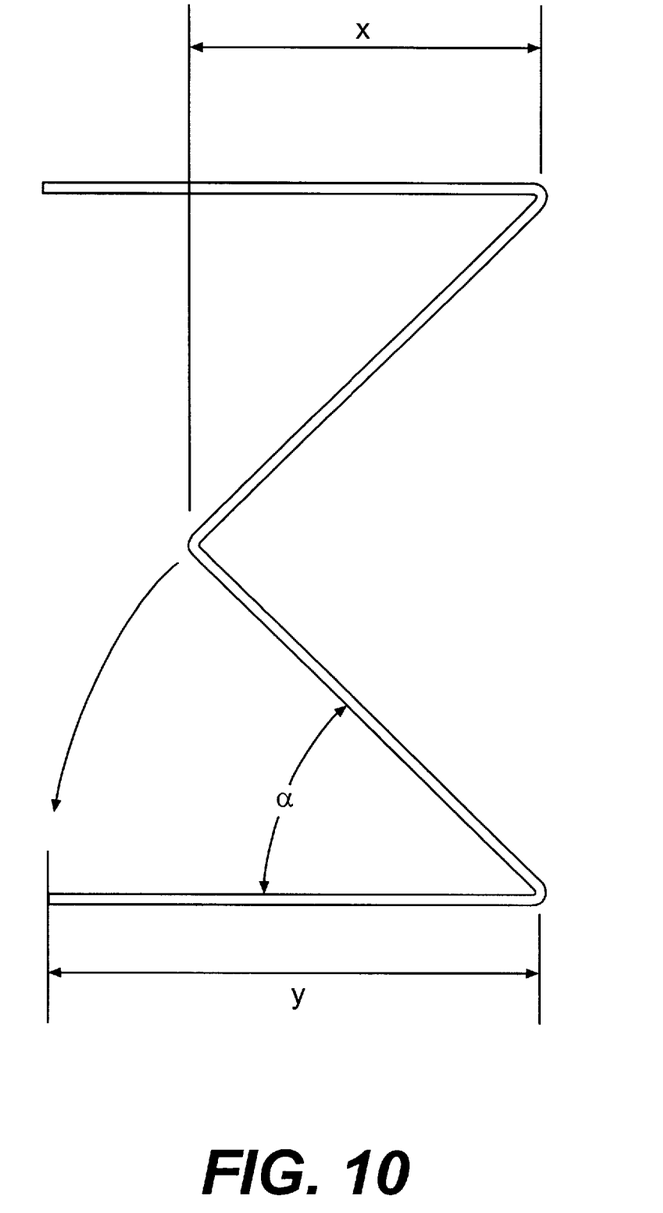
FIG. 10 is a schematic diagram illustrating Design Example I.

FIG. 10 is an example of a bracket that could be used with material that undergoes a 50% increase, due to work hardening, in the stress required to produce a given deformation over the range of strain actually utilized. To counteract this 50% increase, the change in the bracket geometry must result in a 50% increase in the moment of the arm as it deforms. If the initial value of angle α is selected to be 50°, and the ratio of dimension "X" to dimension "Y" is selected to be 0.67, then the moment of the arm increases by 50% as the bracket flattens under the impact of the explosion, and the 50% increase in the required stress (to produce a given deformation) due to work hardening is counteracted by the 50% increase in the moment of the arm, such that the bracket exhibits a constant-load deformation.

In practice, after a starting point is calculated for the design of the bracket as described above, empirical tests must be used to properly "fine tune" the bracket to achieve the desired uniform deformation at the desired constant load. For example, if the load required for deformation is too high, the length for the slanted sections of the bracket could be reduced, or thinner sheet material could be used, or holes 16 could be added, thus reducing the load required for deformation. If the magnitude of the load is approximately in the right range, but the constant load slope is too low (load decreases as the deformation progresses), the material thickness can be increased and the effective arm length decreased to compensate. If it is too high (load increases as deformation progresses), the thickness of the material can be decreased and the effective arm length increased to compensate.

Design Example II

This example was designed for installation in military trucks, such as the HMMWV military vehicles manufactured by AM General Corporation. This example uses the second preferred embodiment, the segmented "C" configuration. Four brackets are spot welded at their ends to form a rectangular platform, as shown in FIG. 8. The brackets are fabricated from 0.048 inches thick, type 304 stainless steel which has been annealed according to MIL-S-5059, ASTM-A240, or AMS-5513.

The two side brackets are 13.16 inches long, 4.75 inches wide at the front end and 3.50 inches wide at the back end. The brackets are bent lengthwise at midline of the sheet to form a 60-degree angle. The side brackets are also bent lengthwise at both ends 1.88 inches inward of the bracket to create 1.88-inch flat mounting sections at the top and bottom of the bracket that are roughly parallel to each other. Thus the side brackets, when fully formed, include two identical slanting sections which form 60-degree angles with the upper and lower flat mounting sections, respectively.

The front bracket is formed from a sheet which is 13.37 inches long and 4.85 inches wide. It is bent lengthwise at midline to form a 120-degree angle. It is also bent lengthwise at both ends 2.00 inches inward from the top side of the bracket and 2.42 inches inward from the bottom side of the bracket. Thus, the front bracket has an upper flat mounting section which is 2.00 inches wide and a lower flat mounting section which is 2.42 inches wide. This asymmetry was necessary to accommodate the existing equipment on the HMMWV. Two slanting sections form the sides of the front bracket. The upper slanting side forms a 114.5-degree angle with the top mounting section, and the lower slanting side forms a 120-degree angle with the bottom mounting section.

The rear bracket is 13.37 inches long and 3.60 inches wide. It is bent lengthwise at midline to form a 120-degree angle. It is also bent lengthwise at both ends 2.25 inches inward from the top and bottom sides of the bracket. Thus, the rear bracket has top and bottom mounting sections which are 2.25 inches wide. The upper slanting section forms a 125.5-degree angle with the upper mounting section, and the lower slanting section forms a 120-degree angle with the lower mounting surface. The difference in these angles was required to accommodate the HMMWV mounting platform and seat.

Each bracket has two bolt holes in the upper section and two in the lower section to connect the welded structure to the existing HMMWV mounting platform and seat.

The foregoing disclosure of the preferred embodiments of the invention has been presented for the purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. An energy-absorbing bracket formed from a unitary metal sheet comprising:
   (a) an upper flat section, said upper flat section having a first edge;
   (b) a lower flat section parallel to the upper flat section, said lower flat section having a first edge;
   (c) a first flat slanting section having a first edge and a second edge, wherein the first edge of the first slanting section is joined to the first edge of the upper flat section forming a common edge between the upper flat section and the first flat slanting section;
   (d) a second flat slanting section having a first edge and a second edge, wherein the second edge of the first slanting section is joined to the first edge of the second slanting section, and wherein the second edge of the second slanting section is joined to the first edge of the lower flat section, forming a common edge between the first flat slanting section and the second flat slanting section and a common edge between the second flat slanting section and the lower flat section;
   (e) means for attaching the lower flat section to a mounting platform; and
   (f) means for attaching the upper flat section to a seat, wherein the bracket exhibits roughly constant load deformation when subjected to a load in the vertical direction above a predetermined threshold value such that, above the predetermined threshold value, the load in the vertical direction required to further deform the bracket is roughly constant until the bracket deformation is at a maximum.

2. The energy-absorbing bracket of claim 1, wherein the metal sheet is a stainless steel metal sheet.

3. The energy-absorbing bracket of claim 2, wherein the stainless steel is type 304 stainless steel.

4. The energy-absorbing bracket of claim 1, wherein the bracket forms a "Σ" shape.

5. The energy absorbing bracket of claim 1, wherein the bracket forms a segmented "C" shape.

6. The energy-absorbing bracket of claim 1, further comprising cut-out holes at at least one of the common edges between the upper flat section and the first flat slanting section, between the first flat slanting section and the second flat slanting section, and between the second flat slanting section and the lower flat section.

7. The energy-absorbing bracket of claim 1, wherein the bracket is a spring with a stiff spring constant such that the bracket has a limited range of elastic deformation, such that the upper flat section of the bracket moves a relatively short distance in comparison the distance from the upper flat section of the bracket to the lower flat section of the bracket, relative to the lower flat section of the bracket, within the range of elastic deformation.

8. The energy-absorbing bracket of claim 7, wherein, during normal use in the absence of a sudden acceleration or deceleration resulting from an accident or an explosion, the bracket stays within the bottom 25% of its elastic range of deformation.

9. The energy-absorbing bracket of claim 1, wherein the roughly constant load under which the bracket exhibits nonelastic deformation is at least 12 Gs for a 170-pound occupant.

10. The energy-absorbing bracket of claim 9, wherein the roughly constant load under which the bracket exhibits nonelastic deformation is not greater than 17 Gs for a 170-pound occupant.

11. The energy-absorbing deformable bracket of claim 1, wherein the reduction, in the force required to further deform the bracket, due to changes in the bracket's configuration as it deforms is roughly cancelled out by the increase in force required due to work hardening of the bracket material.

12. An energy-absorbing deformable bracket formed from a unitary metal sheet comprising:
   (a) an upper flat section;
   (b) a lower flat section parallel to the upper flat section;
   (c) a first flat slanting section, wherein the first slanting section has a common edge with the upper flat section;
   (d) a second flat slanting section, wherein the second slanting section has an edge in common with the first slanting section and an edge in common with the lower flat section;
   (e) means for attaching the lower flat section to a mounting platform; and
   (f) means for attaching the upper flat section to a seat, wherein the bracket exhibits elastic deformation up to a predetermined load in the vertical direction, and inelastic deformation at the predetermined load, and wherein the load in the vertical direction required to continue deforming the bracket remains at roughly that predetermined load as the bracket continues to deform until the bracket deformation is at a maximum.

13. The energy-absorbing bracket of claim 12, wherein the metal sheet is a stainless steel metal sheet.

14. The energy-absorbing bracket of claim 12, wherein the bracket forms a "Σ" shape.

15. The energy absorbing bracket of claim 12, wherein the bracket forms a segmented "C" shape.

16. The energy-absorbing bracket of claim 12, further comprising cut-out holes at at least one of the common edges between the upper flat section and the first flat slanting section, between the first flat slanting section and the second flat slanting section, and between the second flat slanting section and the lower flat section.

17. The energy-absorbing bracket of claim 12, wherein the bracket is a spring with a stiff spring constant such that the bracket has a limited range of elastic deformation, such that the upper flat section of the bracket moves a relatively short distance in comparison the distance from the upper flat section of the bracket to the lower flat section of the bracket, relative to the lower flat section of the bracket, within the range of elastic deformation.

18. The energy-absorbing bracket of claim 17, wherein, during normal use in the absence of a sudden acceleration or deceleration resulting from an accident or an explosion, the bracket stays within the bottom 25% of its elastic range of deformation.

19. The energy-absorbing bracket of claim 12, wherein the predetermined load under which the bracket exhibits nonelastic deformation is at least 12 Gs for an occupant who weighs 170 lbs.

20. The energy-absorbing bracket of claim 19, wherein the predetermined load under which the bracket exhibits nonelastic deformation is no more than 17 Gs for an occupant who weighs 170 lbs.

21. An energy-absorbing deformable bracket formed from a unitary metal sheet comprising:
   (a) an upper flat section;
   (b) a lower flat section parallel to the upper flat section;
   (c) a first flat slanting section, wherein the first slanting section has a common edge with the upper flat section, and wherein the first slanting section has a first initial moment with respect to vertical loads;
   (d) a second flat slanting section, wherein the second slanting section has an edge in common with the first slanting section and an edge in common with the lower flat section, and wherein the second slanting section has a second initial moment with respect to vertical loads;
   (e) means for attaching the lower flat section to a mounting platform; and
   (f) means for attaching the upper flat section to a seat, wherein the bracket exhibits elastic deformation up to a predetermined load, and inelastic deformation thereafter, wherein the upper flat section is roughly directly above the lower flat section, and wherein the load required to continue deforming the bracket remains at roughly that predetermined load as the bracket continues to deform at the predetermined load, because the decrease in the load required for continued deformation due to the increase in the moments of the first and second slanting sections as the bracket is deformed is counteracted by the increase in the load required for continued deformation due to work hardening of the metal sheet.

22. The energy-absorbing bracket of claim 21, wherein the metal sheet is a stainless steel metal sheet.

23. The energy-absorbing bracket of claim 21, wherein the bracket forms a "Σ" shape.

24. The energy absorbing bracket of claim 21, wherein the bracket forms a segmented "C" shape.

25. The energy-absorbing bracket of claim 21, further comprising cut-out holes at at least one of the common edges between the upper flat section and the first flat slanting section, between the first flat slanting section and the second flat slanting section, and between the second flat slanting section and the lower flat section.

26. The energy-absorbing bracket of claim 21, wherein the bracket is a spring with a stiff spring constant such that the bracket has a limited range of elastic deformation, such that the upper flat section of the bracket moves a relatively short distance in comparison the distance from the upper flat section of the bracket to the lower flat section of the bracket, relative to the lower flat section of the bracket, within the range of elastic deformation.

27. The energy-absorbing bracket of claim 26, wherein, during normal use in the absence of a sudden acceleration or deceleration resulting from an accident or an explosion, the bracket stays within the bottom 25% of its elastic range of deformation.

28. The energy-absorbing bracket of claim 21, wherein the predetermined load under which the bracket exhibits nonelastic deformation is at least 12 Gs for an occupant who weighs 170 lbs.

29. The energy-absorbing bracket of claim 28, wherein the predetermined load under which the bracket exhibits nonelastic deformation is no more than 17 Gs for an occupant who weighs 170 lbs.

30. Four of the energy-absorbing brackets recited in claim 21, further comprising a seat and a mounting platform, wherein the four energy-absorbing brackets are installed between the mounting platform and the seat in a rectangular configuration.

31. The energy absorbing bracket of claim 21, wherein the metal sheet is type 304 stainless steel.

32. The energy-absorbing bracket of claim 21, wherein the metal sheet is fabricated from a material, such as stainless steel 304, which has a relatively high elongation characteristic and a stable performance through the plastic deformation range.

33. The energy-absorbing bracket of claim 21, wherein the angle between the second flat slanting section and the lower flat section is approximately 50°.

34. The energy-absorbing bracket of claim 21, wherein the thickness of the sheet metal and the dimensions of the flat slanting sections were selected such that the bracket continues to deform at a predetermined load because the increase, due to work hardening of the sheet metal in the load required to inelastically deform the bracket, is counteracted by effects due to the increased moment of the first and second slanting sections.

35. The energy-absorbing bracket of claim 21, wherein the sheet metal has been annealed according to at least one of MIL-S-5059, ASTM-A240, and AMS-5513.

36. A constant-load deformable bracket comprising:
   (a) a flat rectangular upper section having mounting holes therein;
   (b) a flat rectangular lower section having mounting holes therein which is roughly parallel to the upper section; and
   (c) two flat rectangular slanting sections, wherein the bracket is formed from a single unitary metal sheet which is bent along three roughly parallel lines at first, second and third predetermined angles to form the upper section, the slanting sections and the lower section, and the thickness of the sheet metal and the width of the slanting sections are selected such that, as the bracket undergoes inelastic deformation in the vertical direction, the load in the vertical direction required to continue inelastically deforming the bracket does not change by more than 10% as the bracket is deformed from its initial configuration to its maximum deformation.

37. The constant-load deformable bracket of claim 36, wherein the load required to continue inelastically deforming the bracket remains constant within 5%.

38. The constant-load deformable bracket of claim 36, wherein the constant load is selected to be between 12 Gs and 17 Gs for a 170-pound occupant.

39. The constant-load deformable bracket of claim 36, wherein the sheet metal has been annealed according to at least one of MIL-S-5059, ASTM-A240, and AMS-5513.

40. The constant-load deformable bracket of claim 36, wherein the constant deformation load is selected to be between 12×(P+SW) pounds to 17×(P+SW) pounds, inclusive, where P is equal to 170 lbs and SW is the seat weight.

* * * * *